(12) United States Patent
Ishibashi et al.

(10) Patent No.: US 10,376,863 B2
(45) Date of Patent: Aug. 13, 2019

(54) GAS ADSORBENT, GAS ADSORBENT MANUFACTURING METHOD, GLASS PANEL UNIT

(71) Applicant: Panasonic Intellectual Property Management Co., Ltd., Osaka (JP)

(72) Inventors: Tasuku Ishibashi, Osaka (JP); Eiichi Uriu, Osaka (JP); Hiroyuki Abe, Osaka (JP); Kenji Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 231 days.

(21) Appl. No.: 15/507,053

(22) PCT Filed: Sep. 30, 2015

(86) PCT No.: PCT/JP2015/004964
§ 371 (c)(1),
(2) Date: Feb. 27, 2017

(87) PCT Pub. No.: WO2016/051788
PCT Pub. Date: Apr. 7, 2016

(65) Prior Publication Data
US 2017/0274353 A1  Sep. 28, 2017

(30) Foreign Application Priority Data

Sep. 30, 2014 (JP) ................. 2014-200976

(51) Int. Cl.
*E06B 3/66* (2006.01)
*B01J 20/28* (2006.01)
(Continued)

(52) U.S. Cl.
CPC ........ *B01J 20/28023* (2013.01); *B01D 53/02* (2013.01); *B01D 53/0407* (2013.01);
(Continued)

(58) Field of Classification Search
CPC .............. B01J 20/28023; B01J 20/0203; B01J 2220/42; B01D 53/02; E06B 3/6612; Y02B 80/24; B32B 2250/40; B32B 2260/021
See application file for complete search history.

(56) References Cited

U.S. PATENT DOCUMENTS 5,360,572 A * 11/1994 Hotaling ............ B01D 39/2051
210/188
6,120,584 A    9/2000 Sakata et al.
(Continued)

FOREIGN PATENT DOCUMENTS

JP    H10-331532 A    12/1998
JP    H11-076719 A    3/1999
(Continued)

OTHER PUBLICATIONS

International Search Report issued in Application No. PCT/JP2015/004964 dated Dec. 1, 2015, with English translation.

*Primary Examiner* — Donald J Loney
(74) *Attorney, Agent, or Firm* — McDermott Will & Emery LLP

(57) ABSTRACT

The gas adsorbent of one aspect according to the present invention includes is included in the glass panel unit. The gas adsorbent includes: a substrate made of fiber or a porous substance, of inorganic material; and a liquid containing a getter attached to the substrate.

6 Claims, 6 Drawing Sheets

(51) Int. Cl.
- *B01D 53/02* (2006.01)
- *B01J 20/02* (2006.01)
- *B32B 17/06* (2006.01)
- *B01D 53/04* (2006.01)
- *E06B 3/00* (2006.01)
- *B01J 20/18* (2006.01)
- *B01J 20/32* (2006.01)

(52) U.S. Cl.
CPC ........... *B01J 20/02* (2013.01); *B01J 20/0203* (2013.01); *B01J 20/18* (2013.01); *B01J 20/186* (2013.01); *B01J 20/3204* (2013.01); *B01J 20/3236* (2013.01); *B01J 20/3238* (2013.01); *B01J 20/3287* (2013.01); *B32B 17/06* (2013.01); *E06B 3/00* (2013.01); *E06B 3/6612* (2013.01); *B01D 2253/108* (2013.01); *B01D 2253/1122* (2013.01); *B01J 2220/42* (2013.01); *B32B 2250/40* (2013.01); *B32B 2260/021* (2013.01); *Y02B 80/24* (2013.01)

(56) References Cited

U.S. PATENT DOCUMENTS

| | | |
|---|---|---|
| 2006/0013979 A1 | 1/2006 | Ensinger |
| 2007/0013305 A1 | 1/2007 | Wang et al. |
| 2009/0019815 A1 | 1/2009 | Ensinger |
| 2009/0263587 A1 | 10/2009 | Wang et al. |
| 2010/0136239 A1 | 6/2010 | Wang et al. |
| 2012/0295043 A1 | 11/2012 | Ensinger |
| 2013/0136678 A1* | 5/2013 | Chuntonov ............. H01J 7/183 423/219 |
| 2016/0001524 A1 | 1/2016 | Abe et al. |

FOREIGN PATENT DOCUMENTS

| | | |
|---|---|---|
| JP | 2002-046198 A | 2/2002 |
| JP | 2002-535815 A | 10/2002 |
| JP | 2006-521478 A | 9/2006 |
| JP | 2007-063535 A | 3/2007 |
| JP | 2008-019131 A | 1/2008 |
| JP | 2009-167041 A | 7/2009 |
| JP | 2010-083720 A | 4/2010 |
| JP | 2012-183534 A | 9/2012 |
| JP | 2014-126501 A | 7/2014 |
| WO | 00/044024 A1 | 7/2000 |
| WO | 2014/004936 A1 | 1/2014 |
| WO | 2014/136151 A1 | 9/2014 |

* cited by examiner

GAS ADSORBENT, GAS ADSORBENT MANUFACTURING METHOD, GLASS PANEL UNIT

RELATED APPLICATIONS

This application is the U.S. National Phase under 35 U.S.C. § 371 of international Application No. PCT/JP2015/004964, filed on Sep. 30, 2015, which in turn claims the benefit of Japanese Application No. 2014-200976, filed on Sep. 30, 2014, the disclosures of which are incorporated by reference herein.

TECHNICAL FIELD

The present invention relates to gas adsorbents, gas adsorbent manufacturing methods, and glass panel units.

BACKGROUND ART

Document 1 (WO 2014/004936 A1) discloses a multiple glass pane. The multiple glass pane disclosed in Document 1 includes two glass plates, a hermetically-enclosed space formed between the two glass plates, and an adsorbing member placed inside the hermetically-enclosed space. The adsorbing member is placed inside the hermetically-enclosed space for the purpose of adsorbing unnecessary gas inside the hermetically-enclosed space. The adsorbing member is made of: applying a solution prepared by dissolving adsorbent material in a solvent to one of the glass plates; and drying the applied solution.

As to manufacture disclosed in Document 1, to precisely form the adsorbing member with a desired shape (width), adjustment of a viscosity of the solution is required. Hence, in this manufacture, the solvent which is less volatile at ordinary temperature is used. Additionally, the solvent is required to be unlikely to cause a decrease in adsorbability of the adsorbent material. There are not so many realistic options for the solvent.

Additionally, in some cases, the gas adsorbent fails to have a desired shape, and there may be a problem in productivity.

SUMMARY OF INVENTION

An object to be solved by the present invention would be to propose a gas adsorbent with excellent productivity and high gas adsorbability.

The gas adsorbent of one aspect according to the present invention includes: a substrate made of fiber or a porous substance, of inorganic material; and a liquid containing a getter attached to the substrate.

The gas adsorbent manufacturing method of another aspect according to the present invention is a method for manufacture of the above gas adsorbent, and the method includes: a preparation step of preparing: a substrate made of fiber or a porous substance, of inorganic material; and a liquid containing a getter; and an attachment step of attaching the liquid to the substrate.

The glass panel unit of another aspect according to the present invention includes: a first glass panel; a second glass panel placed opposite the first glass panel; a seal hermetically bonding the first glass panel and the second glass panel; an evacuated space enclosed by the first glass panel, the second glass panel, and the seal; and the above gas adsorbent placed inside the evacuated space.

DESCRIPTION OF EMBODIMENTS

1. Embodiments

[1-1. Configuration of Gas Adsorbent]

Figure 1:
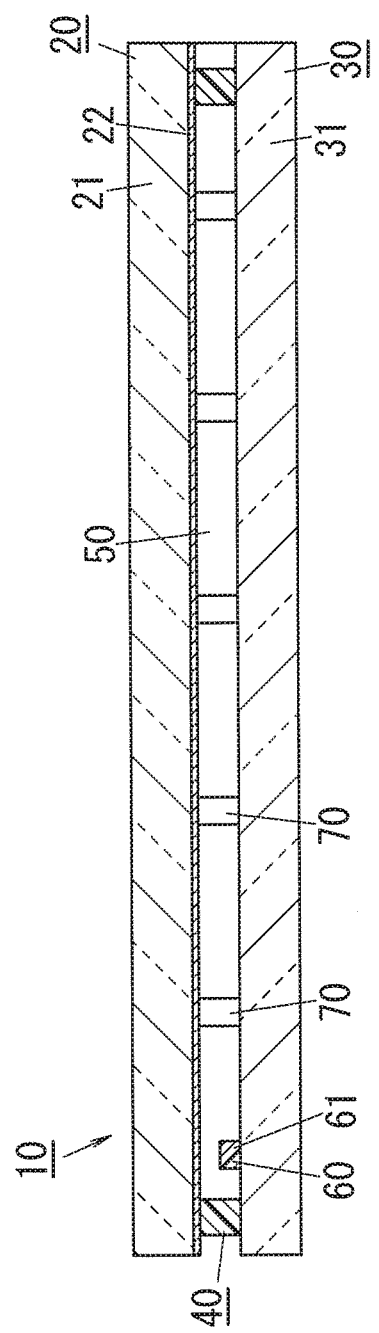
FIG. 1 is a schematic section of the glass panel unit including the gas adsorbent of one embodiment according to the present invention.
Figure 2:
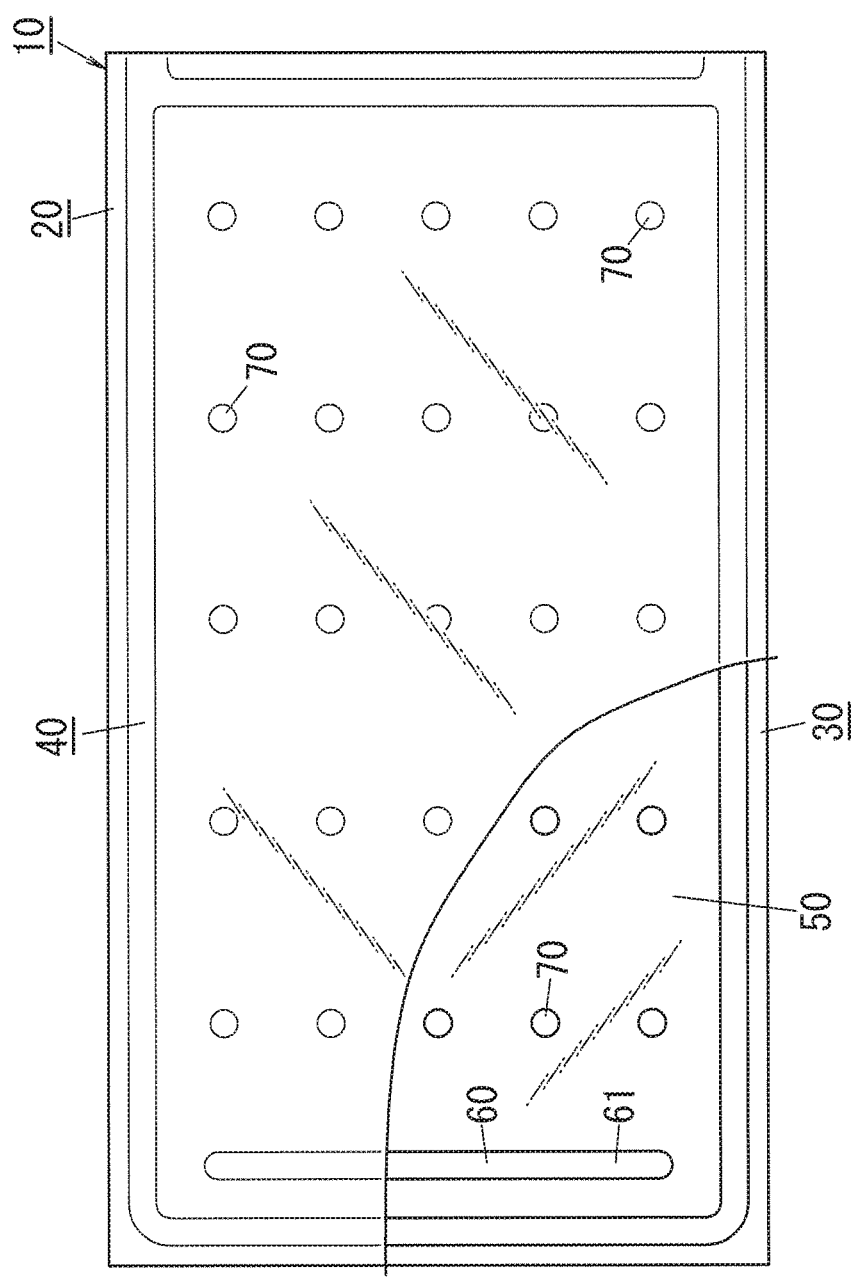
FIG. 2 is a schematic plan of the glass panel unit of FIG. 1.

FIG. 1 and FIG. 2 show a glass panel unit 10 including a gas adsorbent 60 of one embodiment according to the present invention.

The gas adsorbent 60 of the present embodiment is included in a glass panel unit. The gas adsorbent 60 is made of: a substrate 61 made of fiber or a porous substance, of inorganic material; and a liquid containing a getter attached to the substrate 61. In other words, the gas adsorbent 60 includes: the substrate 61 made of fiber or a porous substance, of inorganic material; and a getter fixed to the substrate 61.

the gas adsorbent 60 has an elongated shape, in the present embodiment. The dimensions of the gas adsorbent 60 are appropriately selected according to a glass panel unit where the gas adsorbent 60 is to be used. For example, the gas adsorbent 60 may have a height of 0.1 mm to 1 cm, a length of 1.0 cm to 3 m, and a width of 0.1 cm to 10 cm.

The substrate 61 is made of fiber of inorganic material. Alternatively, the substrate 61 is made of a porous substance of inorganic material. The substrate 61 serves as a support for supporting the getter. Examples of the inorganic material for forming the substrate 61 may include glass and metal. Thus, examples of fiber of the inorganic material forming the substrate 61 may include glass fiber and metal fiber. Examples of metal for forming the substrate 61 may include stable metal which does not change in properties, shape (melt), or the like at a temperature equal to or higher than an activation temperature of the getter (for example, 350° C.). The substrate 61 may be woven fabric, nonwoven fabric, or a fiber bundle, made of fiber of inorganic material. Examples of the substrate 61 may include glass cloth, glass wool, woven metal fabric, and metal wool. Examples of the porous substance of inorganic material forming the substrate 61 may include porous glass and porous metal. Additionally, the porous substance of inorganic material may be a metal foam.

The substrate 61 made of fiber or a porous substance has a relatively large specific surface area. For example, even when having the same size (or weight) as the substrate 61 made of a plate of inorganic material, the substrate 61 made of fiber or a porous substance, of inorganic material has a larger surface area than that. Hence, a relatively large amount of the getter is fixed to the substrate 61 made of fiber or a porous substance. Further, the getter fixed to the substrate 61 may be in contact with a larger space, and thus is likely to adsorb gas. Therefore, as including the substrate 61 made of fiber or a porous substance, the gas adsorbent 60 can have high adsorbing properties.

The substrate 61 defines the shape of the gas adsorbent 60. In the present embodiment, the gas adsorbent 60 has an elongated shape, and thus the substrate 61 also has an elongated shape. For example, the substrate 61 has dimensions such as a height of 0.1 mm to 1 cm, a length of 10 cm to 3 m, and a width of 0.1 cm to 10 cm. The fiber for forming the substrate 61 may have a length of 5 mm to 1 m and a diameter of 0.1 μm to 1 cm, for example.

The getter is a substance having properties of adsorbing molecules smaller than a predetermined size. In the present embodiment, the getter is a substance adsorbing gas.

The getter may be an evaporative getter. The evaporative getter has properties of desorbing adsorbed molecules when having a temperature equal to or higher than a predetermined temperature (activation temperature). Therefore, even if the adsorbability of the evaporative getter has been decreased, the adsorbability of the evaporative getter can be recovered by heating the evaporative getter to a temperature equal to or higher than the activation temperature. Alternatively, the getter may be non-evaporative getter. Differently from the evaporative getter, the non-evaporative getter has properties of not desorbing molecules once adsorbed. Therefore, once adsorbing an amount of molecules to some extent, the adsorbability of the non-evaporative getter cannot recover even if heated to a temperature equal to or higher than the activation temperature. Examples of the getter may include zeolite, ion-exchanged zeolite ((or example, copper ion-exchanged zeolite), an Fe—V—Zr alloy, and a Ba—Al alloy.

[1-2. Gas Adsorbent Manufacturing Method]

Hereinafter, a method for manufacture of the gas adsorbent 60 of the present embodiment is described.

The method for manufacture of the gas adsorbent 60 includes a preparation step, an attachment step, and a drying step. Note that, the drying step may be omitted.

The preparation step includes preparing the substrate 61, and a liquid containing the getter. The liquid containing the getter can be prepared by stirring a liquid obtained by adding the getter to a solvent. When the whole of the added getter is dissolved in the solvent, the liquid containing the getter means a getter solution. When part of the added getter is not dissolved but dispersed in the solvent, the liquid containing the getter means a getter dispersion liquid.

The solvent may preferably have a low probability of reducing the adsorbability of the getter. Examples of the solvent may include water, alcohol, a solution containing alcohol. Examples of the alcohol may include ethanol, isopropyl alcohol, and terpineol. The solvent used in the present embodiment may be highly volatile at ordinary temperature, and may have a boiling temperature equal to or lower than 70° C. In consideration of affinity for the substrate 61 (easiness of permeation of the liquid in the substrate 61 when the liquid is attached to the substrate 61), preferable examples of the solvent may include ethanol and isopropyl alcohol.

Additionally, the solvent may preferably have specific gravity smaller than specific gravity of the getter. When the solvent with specific gravity smaller than specific gravity of the getter is used, the above liquid can have specific gravity smaller than that of the getter, and as a result permeation of the above liquid into the substrate 61 can be facilitated.

The attachment step includes attaching the liquid containing the getter to the substrate 61. For example, the liquid containing the getter may be applied on to the substrate 61. Alternatively, the substrate 61 may be immersed with the liquid containing the getter. Alternatively, the liquid containing the getter may be sprayed on to the substrate 61.

The drying step includes drying the substrate 61 where the liquid containing the getter is attached. This means evaporating the solvent contained in the liquid containing the getter. The substrate 61 may be dried (the solvent may be evaporated) by natural drying, or artificial drying such as heating and blow. As a result of evaporation of the solvent, the getter is fixed to the substrate 61.

Through the aforementioned preparation step, attachment step, and drying step, the gas adsorbent 60 is obtained.

As described above, the gas adsorbent 60 is made of the substrate 61 which is made of fiber or a porous substance of inorganic material and has a relatively large specific surface area. Thus, the gas adsorbent 60 includes a relatively large amount of the getter, and this allows the getter to be in contact with a relatively large space. Therefore, the present embodiment can produce the gas adsorbent 60 with high adsorbability. Further, according to the present embodiment, the shape of the gas adsorbent 60 is determined by the shape of the prepared substrate 61. Hence, it is possible to easily produce the gas adsorbent 60 with a desired shape at high productivity.

[1-3. Configuration of Glass Panel Unit]

The gas adsorbent 60 of the present embodiment is included in the glass panel unit 10. The glass panel unit 10 of the present embodiment is a vacuum insulated glass unit. The vacuum insulated glass unit is a type of multiple glass panels including at least one pair of glass panels, and includes an evacuated space between the pair of glass panels.

In more detail, as shown in FIG. 1 and FIG. 2, the glass panel unit 10 includes a first glass panel 20, a second glass panel 30, a seal 40, an evacuated space 50, a gas adsorbent 60, and multiple spacers 70.

The first glass panel 20 includes a body 21 determining a plan shape of the first glass panel 20, and a coating 22.

The body 21 is rectangular and includes a first face (lower face in FIG. 1) and a second face (upper face in FIG. 1) in a thickness direction which are parallel to each other. Each of the first face and the second face of the body 21 is a flat face. Examples of material of the body 21 may include soda lime glass, high strain point glass, chemically strengthened glass, non-alkaline glass, quartz glass, neoceram, and physically strengthened glass.

The coating 22 is formed on the first face of the body. The coating 22 is an infrared reflective film. Note that, the coating 22 is not limited to an infrared reflective film but may be a film with desired physical properties.

The second glass panel 30 includes a body 31 determining a plan shape of the second glass panel 30.

The body 31 has the same plan shape and plan size as the body 21 (in other words, the second glass panel 30 has the same plan shape as the first glass panel 20). Further, the body 31 has the same thickness as the body 21. Examples of material of the body 31 may include soda lime glass, high strain point glass, chemically strengthened glass, non-alkaline glass, quartz glass, neoceram, and physically strengthened glass.

The body 31 is rectangular and includes a first face (upper face in FIG. 1) and a second face (lower face in FIG. 1) in a thickness direction which are parallel to each other. Each of the first face and the second face of the body 31 is a flat face.

The second glass panel 30 includes the body 31 only. In other words, the body 31 forms the second glass panel 30 by itself. The second glass panel 30 is placed opposite the first glass panel 20. In more detail, the first glass panel 20 and the second glass panel 30 are arranged so that the first face of the body 21 and the first face of the body 31 face and parallel to each other. In other words, the second face of the body 21 is directed outward from the glass panel unit 10, and the first face of the body 21 is directed inward of the glass panel unit 10. Further, the first face of the body 31 is directed inward of the glass panel unit 10, and the second face of the body 31 is directed outward from the glass panel unit 10.

The seal 40 is placed between the first glass panel 20 and the second glass panel 30 to hermetically bond the first glass panel 20 and the second glass panel 30 to each other. Thereby, a space enclosed by the seal 40, the first glass panel 20, and the second glass panel 30 is formed. In the present embodiment, this space has a degree of vacuum (pressure) equal to or lower than a predetermined value, and is referred to as the evacuated space 50.

The seal 40 is formed of thermal adhesive. Examples of the thermal adhesive may include glass frit. Examples of the glass fit may include low-melting-point glass frit. Examples of the low-melting-point glass frit may include bismuth-based glass frit, lead-based glass frit, and vanadium-based glass frit.

The seal 40 has a rectangular frame shape. The seal 40 has the same plan shape as each of the bodies 21 and 31, but the seal 40 has a smaller plan size than each of the bodies 21 and 31. The seal 40 is formed to extend along an outer periphery of the second glass panel 30. In other words, the seal 40 is formed to cover an almost entire region on the second glass panel 30.

The evacuated space 50 is a space with a degree of vacuum equal to or lower than a predetermined value, and the predetermined value may be 0.1 Pa, for example. The evacuated space 50 is completely hermetically enclosed by the first glass panel 20, the second glass panel 30, and the seal 40, and thus is separated from outside air.

The multiple spacers 70 are used to keep a predetermined interval between the first glass panel 20 and the second glass panel 30. In other words, the multiple spacers 70 are used to keep a distance between the first glass panel 20 and the second glass panel 30 to a desired value.

The multiple spacers 70 are placed inside the evacuated space 50. In more detail, the multiple spacers 70 are placed at individual intersections of an imaginary rectangular lattice. For example, an interval between the multiple spacers 70 is 2 cm. Note that, sizes of the spacers 70, the number of spacers 70, intervals between the spacers 70, and pattern of arrangement of the spacers 70 may be appropriately determined.

Each spacer 70 has a solid cylindrical shape with a height almost equal to the aforementioned predetermined interval. For example, each spacer 70 has a diameter of 1 mm and a height of 100 μm. Note that, each spacer 70 may have a desired shape such as a solid prismatic shape and a spherical shape.

Each spacer 70 is made of light-transmissive material. Note that, each spacer 70 may be made of opaque material, providing that it is sufficiently small. It is preferable that the spacer 70 be more unlikely to deform than the seal 40. For example, material of the spacers 70 is selected to have a higher softening point (softening temperature) than material of the seal 40.

The gas adsorbent 60 is placed inside the evacuated space 50. In more detail, the gas adsorbent 60 has an elongated shape, and is placed on one end in a lengthwise direction (a left end in FIG. 2) of the second glass panel 30 to extend along a width direction (upward and downward direction in FIG. 2) of the second glass panel 30. In summary, the gas adsorbent 60 is placed on an end of the evacuated space 50. Accordingly, the gas adsorbent 60 can be unlikely to be perceived.

In the example shown in FIG. 1 and FIG. 2, the gas adsorbent 60 is fixed to the second glass panel 30. And, the gas adsorbent 60 is not in contact with the seal 40. Additionally, the gas adsorbent 60 has a height (dimension in the upward and downward direction in FIG. 1) which is smaller than the aforementioned predetermined interval.

The gas adsorbent 60 is used to adsorb unnecessary gas (for example, residual gas). The unnecessary gas may include gas emitted from the seal 40 in a process of forming the seal 40 by heating the material of the seal 40 to hermetically bond the first glass panel 20 and the second glass panel 30 to each other.

Note that, it is preferable that the gas adsorbent 60 be more unlikely to soften (melt) than the seal 40 of the glass panel unit 10. For example, the substrate 61 of the gas adsorbent 60 is selected to have a higher softening point (melting point) than the material of the seal 40.

[1-4. Method for Manufacture]

Hereinafter, a method of the present embodiment for manufacture of the glass panel unit 10 is described. The method of the present embodiment for manufacture of the glass panel unit 10 includes the first to sixth steps. Note that, the order of the second to fourth steps may be modified.

The first step is a step (panel formation step) of forming the first glass panel 20 and the second glass panel 30. The first step includes preparing the first glass panel 20 and the second glass panel 30. The first step may include cleaning the first glass panel 20 and the second glass panel 30 if necessary.

The second step is a step (seal formation step) of forming the seal 40. The second step includes applying the material of the seal 40 (thermal adhesive) on the second glass panel 30 (the first face of the body 31) with a dispenser or the like.

The third step is a step (gas adsorbent placing step) of placing the gas adsorbent 60. The third step includes placing the gas adsorbent 60 in a predetermined position on the second glass panel 30 (the first face of the body 31).

In the third step, the gas adsorbent 60 may be not only placed on but only fixed to the second glass panel 30. For example, the gas adsorbent 60 produced through the aforementioned method for manufacture may be fixed to the second glass panel 30 with thermal adhesive (for example, the aforementioned glass frit). In this case, the second step may preferably include applying the material of the seal 40 (thermal adhesive) to a placement region of the second glass panel 30 reserved for the gas adsorbent 60, and the gas adsorbent 60 may be bonded (fixed) with the applied material. This can improve efficiency and thus is preferable.

Alternatively, the substrate 61 where the liquid containing the getter is attached (in other words, the substrate 61 obtained through the aforementioned attachment step) is placed on the second glass panel 30. After that, this substrate 61 is dried while it is on the second glass panel 30. Thereby, the gas adsorbent 60 is formed on and thus fixed to the second glass panel 30.

The fourth step is a step (spacer formation step) of forming the spacers 70. The fourth step may include placing the multiple spacers 70 in individual predetermined locations on the second glass panel 30 with a chip mounter. Note that, the multiple spacers 70 are formed in advance. Alternatively, the multiple spacers 70 may be formed by use of photolithography techniques and etching techniques. In this case, the multiple spacers 70 may be made of photocurable material or the like. Alternatively, the multiple spacers 70 may be formed by use of known thin film formation techniques.

The fifth step is a step (placing step) of placing the first glass panel 20 and the second glass panel 30. The fifth step may include placing the first glass panel 20 and the second glass panel 30 so that the first face of the body 21 and the first face of the body 31 face and are parallel to each other.

The sixth step is a step of hermetically bonding the first glass panel 20 and the second glass panel 30 with the seal 40. For example, the material of the seal 40 is heated to be melted once while the first glass panel 20 is kept in contact with the material of the seal 40 applied to the second glass panel 30. Thereafter, the melted material of the seal 40 is solidified to form the seal 40 and thereby the first glass panel 20 and the second glass panel 30 are bonded hermetically to each other.

Alternatively, the method for forming the evacuated space 50 may be selected from appropriate methods. For example, an evacuation opening is provided to any of the first glass panel 20, the second glass panel 30, and the seal 40. In the sixth step, the space enclosed by the first glass panel 20, the second glass panel 30, and the seal 40 is evacuated through the evacuation opening, and subsequently the evacuation opening is closed. Thereby, the evacuated space 50 can be formed. Alternatively, the first glass panel 20 and the second glass panel 30 can be hermetically bonded in vacuum, and thereby the evacuated space 50 can be formed.

Through the aforementioned first to sixth steps the glass panel unit 10 is obtained.

[2-1. Modification 1]

Figure 3:
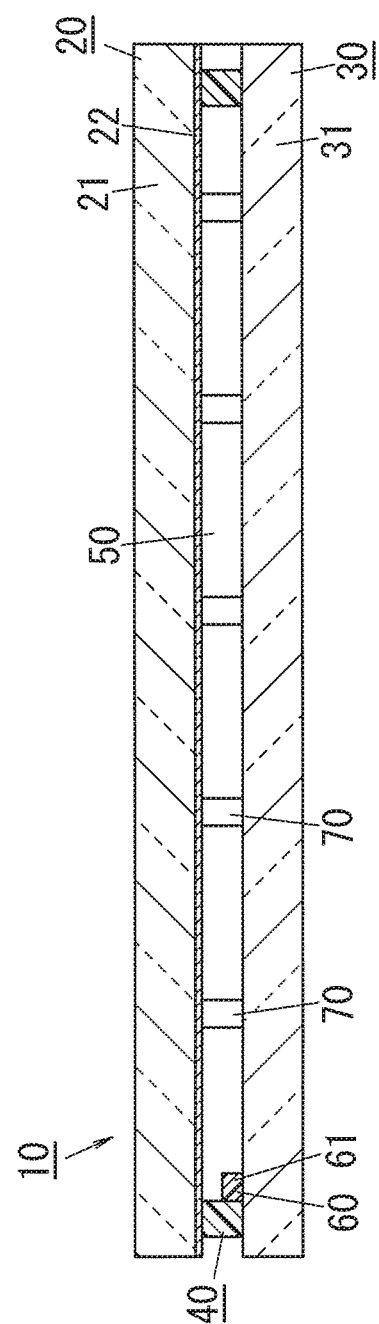
FIG. 3 is a schematic section of the glass panel unit including the gas adsorbent of Modification 1 of the embodiment according to the present invention.
Figure 4:
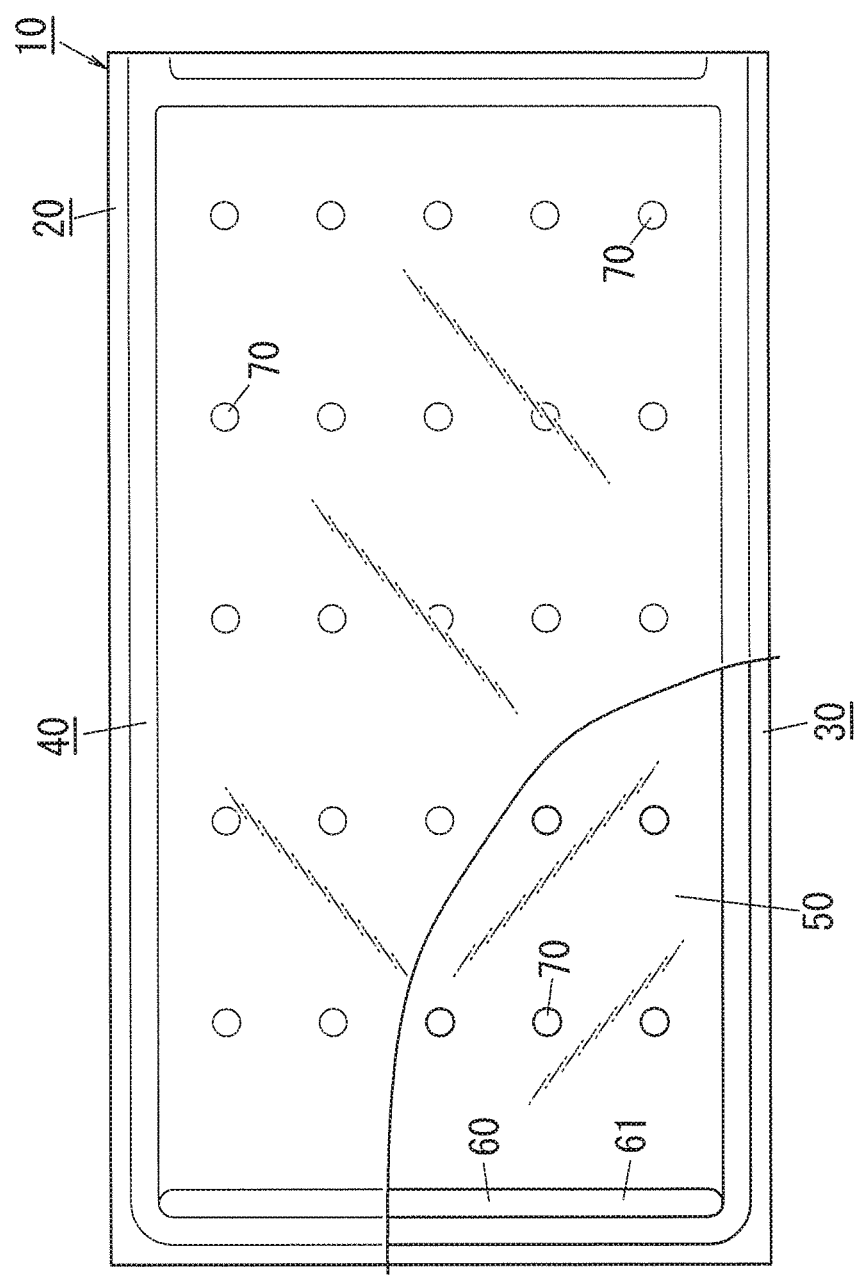
FIG. 4 is a schematic plan of the glass panel unit of FIG. 3.

FIG. 3 and FIG. 4 show the glass panel unit 10 including the gas adsorbent 60 of Modification 1 of one embodiment according to the present invention.

In the glass panel unit 10, the gas adsorbent (60) of Modification 1 is fixed to the seal (40) differently from the gas adsorbent (60) of FIG. 1 and FIG. 2. Thus, the gas adsorbent (60) is in contact with the seal (40). The gas adsorbent (60) of Modification 1 can be formed of the same materials and by the same methods as the gas adsorbent (60) shown in FIG. 1 and FIG. 2.

In Modification 1, the gas adsorbent 60 has an elongated shape (I-shape), and is placed one end in the lengthwise direction (the left end in FIG. 4) of the second glass panel 30 to extend along the width direction (the upward and downward direction in FIG. 4) of the second glass panel 30. However, according to the present embodiment, the gas adsorbent 60 with a desired shape can be produced easily. The gas adsorbent 60 may have a U-shape extending along three sides or an L-shape extending along two sides, of the seal 40 with a rectangular frame shape.

For example, in the third step, the gas adsorbent (60) of Modification 1 is placed on the second glass panel (30) (the first face of the body (31)) to be in contact with the material of the seal (40). By doing so, in the sixth step, the gas adsorbent (60) can be fixed to the seal (40) through hermetically bonding the first glass panel (20) and the second glass panel (30) to each other by heating the applied material of the seal (40).

[2-2. Modification 2]

Figure 5:
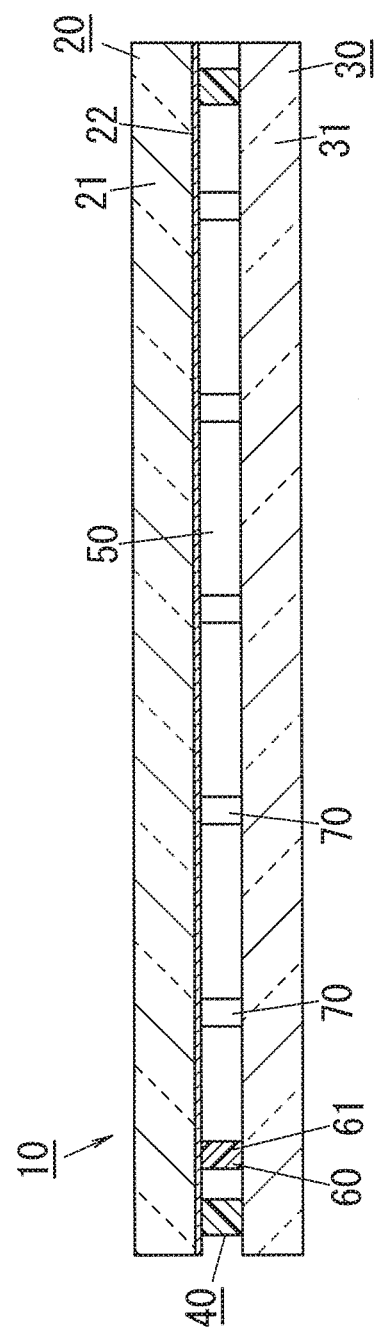
FIG. 5 is a schematic section of the glass panel unit including the gas adsorbent of Modification 2 of the embodiment according to the present invention.
Figure 6:
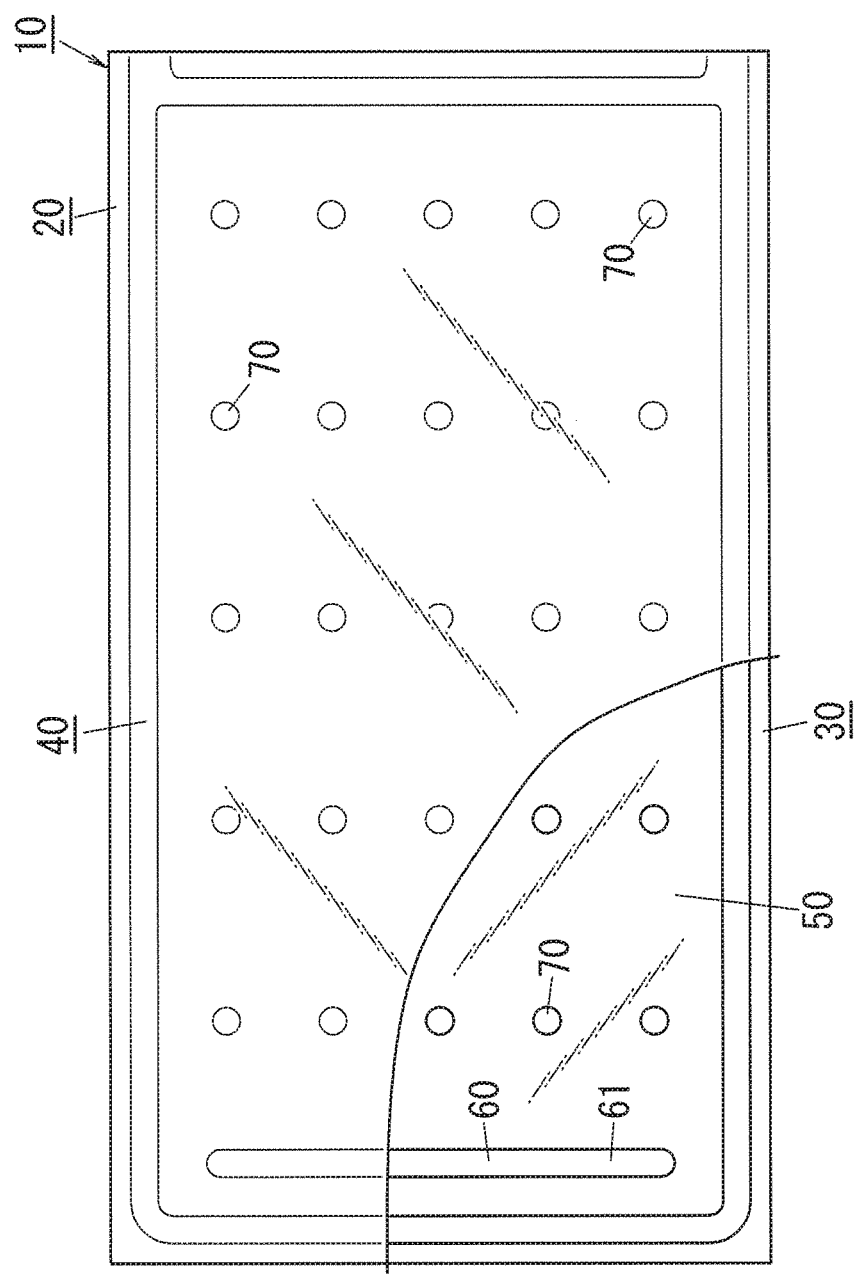
FIG. 6 is a schematic plan of the glass panel unit of FIG. 5.

FIG. 5 and FIG. 6 show the glass panel unit 10 including the gas adsorbent (60) of Modification 2 of one embodiment according to the present invention.

In the glass panel unit 10, the gas adsorbent (60) of Modification 2 is fixed by being sandwiched between the first glass panel (20) and the second glass panel (30) differently from the gas adsorbents (60) shown in FIG. 1 to FIG. 4. Note that, the gas adsorbent (60) of Modification 2 can be formed of the same materials and by the same methods as the gas adsorbent (60) shown in FIG. 1 and FIG. 2.

The gas adsorbent (60) of Modification 2 has a height (dimension in the upward and downward direction in FIG. 5) which is equal to the aforementioned predetermined interval. Therefore, for example, in the sixth step, the first glass panel (20) and the second glass panel (30) are bonded so that the interval between the first glass panel (20) and the second glass panel (30) is equal to the aforementioned predetermined interval, and thereby the gas adsorbent (60) is fixed by being sandwiched between the first glass panel (20) and the second glass panel (30). Note that, the gas adsorbent (60) of Modification 2 may or may not be bonded to the second glass panel 30.

[2-3. Modification 3]

In the aforementioned embodiment, the gas adsorbent (60) has an elongated shape, but may have another shape. Alternatively, the gas adsorbent (60) need not be on an end of the evacuated space (50). Note that, in the examples shown in FIG. 1 to FIG. 4, the gas adsorbent (60) is fixed to the second glass panel 30 but may be fixed to the first glass panel 20 instead.

In the aforementioned embodiment, the glass panel unit (10) is rectangular but may have a desired shape such as a circular shape and a polygonal shape. In other words, each of the first glass panel (20), the second glass panel (30), and the seal (40) may have a desired shape such as a circular shape and a polygonal shape, other than a rectangular shape. Note that, the shape and size of the glass panel unit (10) may be selected in consideration of use of the glass panel unit (10).

Additionally, each of the first face and the second face of the body (21) of the first glass panel (20) may not be limited to a flat face. Similarly, each of the first face and the second face of the body (31) of the second glass panel (30) may not be limited to a flat face.

Additionally, the body (21) of the first glass panel (20) and the body (31) of the second glass panel (30) may not have the same plan shape and the same plan size. Additionally, the body (21) and the body (31) may not have the same thickness. Additionally, the body (21) and the body (31) may not be made of the same material.

Additionally, the seal (40) may not have the same plan shape as each of the first glass panel (20) and the second glass panel (30).

Additionally, the first glass panel (20) may further include a coating which is formed on the second flat face of the body (21) and has desired physical properties. Or, the first glass panel (20) may not include the coating (22). This means that the first glass panel (20) may include the body (21) only.

Additionally, the second glass panel (30) may further include a coating with desired physical properties. The coating may include at least one of thin films individually formed on the first face and the second face of the body (31), for example. Examples of the coating may include a film reflecting light with a specific wavelength (for example, an infrared reflective film and an ultraviolet reflective film).

In the aforementioned embodiment, the glass panel unit (10) includes multiple spacers (70). However, the glass panel unit (10) may include a single spacer (70). Or, the glass panel unit (10) may not include any spacer (70).

3. Aspects According to Present Invention

As obviously derived from the aforementioned embodiment and modifications, the gas adsorbent (60) of the first aspect according to the present invention includes: a substrate (61) made of fiber or a porous substance, of inorganic material; and a liquid containing a getter attached to the substrate (61).

According to the first aspect, it is possible to produce the gas adsorbent (60) with excellent productivity and high gas adsorbability.

The gas adsorbent (60) of the second aspect according to the present invention would be realized in combination with the first aspect. In the second aspect, the inorganic material is glass.

According to the second aspect, the gas adsorbent (60) can have a coefficient of thermal expansion and thermal conductivity which are close to those of the glass panels (20, 30) and the seal (40).

The gas adsorbent (60) of the third aspect according to the present invention would be realized in combination with the first aspect. In the third aspect, the inorganic material is metal.

According to the third aspect, the gas adsorbent (60) can have sufficient strength.

The gas adsorbent manufacturing method of the fourth aspect according to the present invention is a method for manufacture of the gas adsorbent (60) of any one of the first to third aspects. The method includes: a preparation step of preparing: a substrate (61) made of fiber or a porous substance, of inorganic material; and a liquid containing a getter; and an attachment step of attaching the liquid to the substrate (61).

According to the fourth aspect, it is possible to produce the gas adsorbent (60) with excellent productivity and high gas adsorbability.

The glass panel unit (10) of the fifth aspect according to the present invention includes: a first glass panel (20); a second glass panel (30) placed opposite the first glass panel (20); a seal (40) hermetically bonding the first glass panel (20) and the second glass panel (30); an evacuated space (50) enclosed by the first glass panel (20), the second glass panel (30), and the seal (40); and the gas adsorbent (60) of any one of the first to third aspects placed inside the evacuated space (50).

According to the fifth aspect, the glass panel unit (10) can include the gas adsorbent (60) with excellent productivity and high gas adsorbability.

The glass panel unit (10) of the sixth aspect according to the present invention would be realized in combination with the fifth aspect. In the sixth aspect, the gas adsorbent (60) is fixed to the seal (40).

According to the sixth aspect, the gas adsorbent (60) can be fixed easily.

The glass panel unit (10) of the seventh aspect according to the present invention would be realized in combination with the fifth aspect. In the seventh aspect, the gas adsorbent (60) is fixed by being sandwiched between the first glass panel (20) and the second glass panel (30).

According to the seventh aspect, the gas adsorbent (60) can be fixed easily.

The invention claimed is:

1. A glass panel unit comprising:
   a first glass panel;
   a second glass panel placed opposite the first glass panel;
   a seal hermetically bonding the first glass panel and the second glass panel;
   an evacuated space enclosed by the first glass panel, the second glass panel, and the seal; and
   a gas adsorbent placed inside the evacuated space,
   the gas adsorbent including a substrate made of fiber or a porous substance, of inorganic material, and a liquid containing a getter attached to the substrate, and
   the substrate having a higher softening point than material of the seal.

2. The glass panel unit of claim 1, wherein the gas adsorbent is fixed to the seal or is fixed by being sandwiched between the first glass panel and the second glass panel.

3. The glass panel unit of claim 1, wherein the gas adsorbent is fixed to the seal through hermetically bonding the first glass panel and the second glass panel to each other by heating the material of the seal.

4. The glass panel unit of claim 1, wherein the inorganic material is glass or metal.

5. A method for manufacture of the glass panel unit of claim 1, the method comprising:
   applying the material of the seal on the second glass panel;
   placing the gas adsorbent on the second glass panel; and
   hermetically bonding the first glass panel and the second glass panel with the seal heated.

6. The method of claim 5, wherein the gas adsorbent is placed on the second glass panel to be in contact with the material of the seal.

* * * * *